Patented Dec. 21, 1937

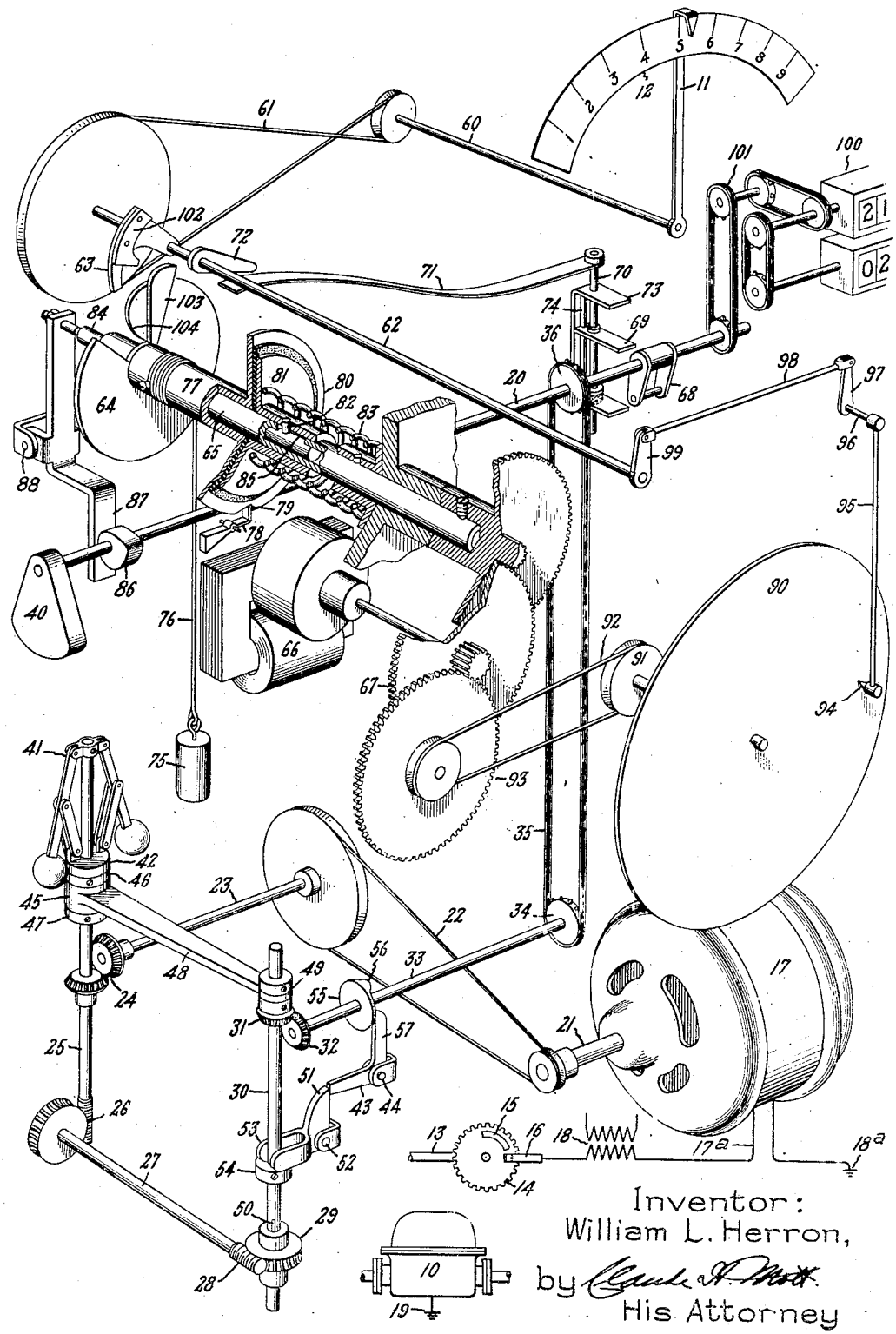

2,103,077

UNITED STATES PATENT OFFICE 2,103,077

METER

William L. Herron, Hudson, N. Y.

Application September 24, 1936, Serial No. 102,370

16 Claims. (Cl. 73—205)

My invention relates to meters, and has for its object a simple and reliable device for giving an indication of the rate of flow of a substance in response to the operation of an integrating or totalizing meter.

More particularly my invention relates to a "rate of flow" meter especially adapted to be used in conjunction with a total quantity or integrating meter which registers the quantity of a substance flowing through it, such as an electrical, gas, or water integrating meter. It is often desired in conjunction with integrating meters, particularly water meters, to know the rate of flow. This can only be obtained from an integrating meter by observing the amount of water or other substance flowing during a predetermined time interval. This procedure is obviously a tedious one and furthermore it is impractical where the rate of flow is subject to relatively great and sudden changes. Moreover, information relative to the rate of flow is often desired at a point remote from the integrating meter.

A further object of my invention is a rate of flow indicating meter which may be located at any place, however remote from the integrating meter, where information relative to the rate of flow is useful, such as a pumping or electrical generating station, and which is operated by the integrating meter through simple one or two wire electrical connections therewith.

In carrying out my invention, I utilize a rotating element of the integrating meter which rotates at a speed proportional to the rate of flow. Associated with this rotating element I provide an electrical contact device for closing and opening a circuit to start and stop an electric driving motor at least once each revolution of the rotating element. The driving motor during each period of operation moves an indicator operating member into engagement with a cam which is driven by a constant speed timing motor, and thereafter resets the cam in a predetermined starting position. Thus the position of the indicator member is determined by the position of the cam, which position is a function of the time between operations of the driving motor, and hence a measure of the rate of flow of the substance being measured.

The accompanying drawing is a simplified view in perspective of a meter embodying my invention.

Referring to the drawing I have shown my invention in one form as applied to an integrating or totalizing water meter 10 although it obviously has application to integrating meters in general irrespective of the substance being measured, whether it be liquids, gases, electricity, a granular substance, such as wheat, or any substance or articles being conveyed and the quantity of which passing a given point or station is registered by a totalizing meter. The water meter 10 is of conventional construction and is shown in outline only. It will be understood that the meter 10 indicates the total amount of water which flows through the meter either in gallons or cubic feet. It does not indicate the rate of flow. In accordance with my invention I provide mechanism controlled by the meter 10 through a simple one or two wire electrical connection for moving a pointer 11 so as to indicate on a suitable scale 12 the rate of flow of the water through the meter 10.

It is a requirement of my invention, however, that the meter 10 be provided with an element having movement repeatedly over a predetermined path, such as a shaft 13, and at a speed proportional to the rate of flow of the substance being measured. The conventional integrating water meter 10 is provided with such an element 13. Furthermore a conventional integrating water meter is provided with a gear wheel 14 on this shaft 13. It will be understood, however, that if a suitable gear wheel 14 is not conveniently available in the water meter, I replace the shaft 13 of the meter with a longer shaft on which I mount a suitable part 14 which in that case may take the form of a simple disk.

Secured to one side of the gear wheel 14 I provide an electrically conducting arcuate contact 15. Cooperating with this contact 15 is a stationary spring contact arm 16 which engages the contact 15 when the contact 15 passes under it, as shown in the drawing, once each revolution of the gear 14 and thereby closes an electrical circuit to start an electrical driving motor 17. I contemplate that the motor 17 may be located at some distance from the meter 10. Its circuit is indicated by a conductor 17a leading from one terminal of the motor through a suitable voltage transformer 18 to the contact arm 16. The other terminal of the motor is grounded at point 18a and the contact 15 is likewise grounded through the meter 10 as indicated at the point 19. Preferably the driving motor 17 is a single phase alternating current motor of the split phase or repulsion induction type, although a direct current motor may be used in case a suitable source of direct current power is available.

It will be observed that the motor 17 is started each revolution of the gear wheel 14 when the contact 15 engages the contact arm 16 and is stopped when the contact disengages the contact arm thereby opening its circuit. It will be understood to insure greater reliability a suitable relay may be used between the contact device 15, 16 and the motor. The arcuate length of the contact 15 is chosen with relation to the speed of the gear wheel 14 to provide a period of operation of the motor for the maximum speed of the gear wheel with maximum rate of flow of water through the meter 10 which is of sufficient duration to carry out the driving operation to be hereinafter described. It will be understood of course that the greater the speed of the gear wheel the shorter will be each period of operation of the motor 17, assuming a contact 15 of given length.

In the particular mechanism which I have shown in the drawing, the primary function of the driving motor 17 is to effect one complete revolution of a shaft 20 each time the motor 17 is started, regardless of the length of time the motor operates after this revolution is completed, the shaft 20 in turn actuating the pointer 11. The shaft 21 of the motor is operatively connected to the shaft 20 through a series of shafts and speed reducing gears, the shaft 20 being driven at a relatively slow speed. This connection comprises a pulley and belt connection 22 to a shaft 23, and the bevel gears 24, shaft 25, worm and worm wheel drive 26, shaft 27, worm 28, worm wheel 29, shaft 30, bevel gears 31, 32, shaft 33, sprocket wheel 34, chain 35, and the sprocket wheel 36 secured to the shaft 20.

For the purpose of assuring that the shaft 20 shall be turned at least one complete revolution but not more than one complete revolution each time the driving motor 17 is started, I have provided means for disconnecting it from the driving motor at some time after the shaft has been turned through a half revolution but before it has been turned through a complete revolution, the shaft then being turned by a counterweight 40 secured thereto to complete the revolution. The interruption of the driving connection with the driving motor is effected by a speed responsive device 41 of the well-known flyball centrifugal type secured to the shaft 25. When the driving motor is running this device 41 rotates with the shaft 25 and its balls tend to move outward and move thus upward a collar 42 which is slidably mounted on the shaft 25. However, while the shaft 20 is being turned through more than the first half revolution to bring the counterweight 40 at least slightly past center so that it can complete the single complete revolution of the shaft 20, the collar 42 is held against movement by means of a latch arm 43 mounted on a pivot 44. Thus the collar 42 is provided with a non-rotatable sleeve 45 encircling it but moved, by means of end rings 46 and 47 on the collar 42, with the collar 42 axially of the shaft 25. The sleeve 45 is provided with a laterally extending arm 48 which at its end is provided with a connection 49 with the shaft 30 allowing free rotation of the shaft but preventing relative movement of the arm 18 axially of the shaft. In turn the shaft 30 is slidable axially in bearings (not shown) and is slidable in the worm wheel 29, a splined connection 50 with the worm wheel 29 being provided. The latch arm 43 abuts against one end of a bell crank 51 having a pivot 52, the other end of the bell crank being provided with a fork 53 embracing the shaft 30. A collar 54 is secured to the shaft 30 in position to bear against the fork 53, as shown in the drawing, whereby axial movement of the shaft upward by the centrifugal device is prevented so long as the latch arm 43 is in its latching position shown.

For the purpose of disengaging the latch 43, the shaft 33 is provided with a collar 55 secured thereto and provided on one side with a cam projection 56. This cam 56 is in position to engage the upper end 57 of the latch 43 when the shaft 33 is turned by the driving motor. When the shaft 20 has been turned somewhat more than one-half revolution the cam 56 will have engaged the end 57 and moved the latch 43 in a clockwise direction about its pivot 44 sufficiently to disengage the other end of the latch 43, by upward movement, from the abutting end of the bell crank. The shaft 30, upon being thus released, is moved axially upward by the centrifugal device 41 whereby the bevel gear 31 secured to the shaft 30 is moved upward out of engagement with the bevel gear 32 and the shaft 20 thereby disconnected from the driving motor. It will be observed that the bevel gears 31, 32 thus provide a releasable driving connection. Thereafter the counterweight 40 completes the single revolution of the shaft 20. The driving motor however continues to drive the centrifugal device thereby preventing reestablishment of the driving connection so long as the driving motor is running.

When the driving motor 17 is stopped by the opening of its circuit by the contact device 15, 16, the centrifugal device and the parts operated by it resume their positions indicated in the drawing, whereby the bevel gear 31 drops into mesh with the bevel gear 32. The bell crank 51 follows the collar 54 downward and the latch 43 drops down behind the bell crank thus securing it. As shown the bell crank 51 and the latch 43 are overbalanced in counterclockwise directions about their respective pivots so that they assume their latching positions when the shaft 30 is lowered.

Having thus explained the cycle of operations of driving motor 17 in turning the shaft 20 one revolution for each revolution of the gear wheel 14, the connections between the shaft 20 and the rate of flow indicating pointer 11 will now be described.

As shown the pointer is mounted on a shaft 60 which is connected through a pulley and belt drive 61 with a shaft 62. The shaft 62 carries a cam follower 63 which is secured to the shaft 62 just above a cam 64 releasably connected to a shaft 65. By means of a constant speed driving motor 66, preferably a constant speed alternating current motor of the type described and claimed in U. S. Patent No. 1,546,269 to H. E. Warren, connected to the shaft 65 through a speed reducing gear train 67, the cam 64 is driven as a function of time starting from the predetermined angular position shown in the drawing. As the shaft 20 is rotated by the driving motor 17, a crank arm 68 secured to the shaft engages and moves upward a slider member 69 secured to a rod 70, the shaft 20 turning in a clockwise direction as viewed from the end bearing the counterweight 40. The rod 70 carries a flexible metal arm 71 which as it moves upward with the rod 70 engages an arm 72 secured to the shaft 62 thus turning the shaft 62 in a counterclockwise direction until the cam follower 63 engages the cam 64. This rotation of the shaft 62 is transmitted suitably amplified by the belt drive 61 to the pointer shaft 60 whereby the pointer is moved to indicate on the scale 12 the rate of flow of water. Further upward movement of the rod 70 is taken up in the flexing of the arm 71, the rod 70 having sufficient upward movement to assure engagement between the cam follower 63 and the cam for all positions of the cam. It will be understood that when the rate of flow decreases the cam 64 has a longer time in which to turn and therefore during a cycle of decreasing flow engages the follower 63 and moves the pointer back, positioning it, before the motor 17 is started.

As shown the rod 70 is slidably mounted in a bracket 73. The rearward end of the arm 69 is forked and embraces an upright guide 74 secured to the bracket 73 whereby the rod 70 and arm 69 are secured against turning movement in the bracket 73.

This adjustment of the pointer, if adjustment is required as determined by the position of the cam 64, is preferably made during the first half revolution of the shaft 20. Soon after this adjustment is made the cam 64 is released momentarily from its driving shaft 65 whereupon it is rotated in a clockwise direction in accordance with a suitable bias applied to it back to the predetermined angular starting position shown in the drawing. As shown this bias is applied by means of a weight 75 hung on a cord 76 wrapped around a drum or hub 77 secured to the cam. Preferably the predetermined angular position of the cam shown in the drawing is determined by a stop arm 78, shown as a pivoted counterweight arm, which engages a projection formed by a recess 79 in a disk 80 secured to the other end of the hub 77, thereby bringing the cam to rest when it is reset by the weight 75.

To provide for this resetting operation the cam is releasably connected to the shaft 65 through a friction clutch comprising a plate 81 slidably connected at its hub to the shaft 65 by a splined connection effected through a pin 82, and pressed by a spring 83 against the disk 80 which forms a clutch plate. To release the clutch, the plate 81 is moved away from the plate 80 by means of a rod 84 running through the shaft 65, which is hollow, and bearing a pin 82. The pin 82 slides in an axial slot 85 in the hollow shaft 65. As the shaft 20 is rotated a releasing cam 86 secured to it is moved into engagement with the lower end of a lever arm 87 having a pivot 88, and moves the lever arm in a clockwise direction whereby its upper end pushes the rod 84 toward the right. The pin 82 moves the clutch plate 81 with the shaft 84 thereby releasing the cam 64 from the shaft 65. It will be understood that the hub 77 and cam are suitably secured against axial movement on the shaft 65 toward the left hand as seen in the drawing. The cam is then reset quickly by the weight 75. Preferably, and as shown, the clutch is released during the first half of each revolution of the shaft 20.

I contemplate that the peripheral outline of the cam 64 will be such that the scale 12 has divisions of equal length for a given change in the rate of flow. Its shape for the associated driving mechanism disclosed is indicated in the drawing. This shape may be found by moving the pointer 11 from point to point of the scale 12 and finding the actual position of the end of the cam follower 63 for each scale point. Thus assuming that each revolution of the element 13 corresponds in the meter 10 to one gallon of water passing through the meter, for one gallon per minute flow the element 13 would make one complete revolution in one minute and the timing motor 66 would be driving the cam 64 for a one-minute period. Thus a blank disk might be secured in place of the cam, the motor 66 permitted to drive it for one minute and then the position of the cam follower 63 marked on the disk with the pointer on the first scale division. For five gallons per minute the position would be marked after the timing motor 66 had driven the disk for ⅕ the time, i. e. twelve seconds, the pointer being moved to division 5. These points may be found in this manner throughout the scale and a curve drawn through the points to get the shape of the cam.

The cam 64, however, is an Archimedean spiral, i. e. its radius increases in equal increments for equal increments of angular displacement. The equation of the curve is therefore $r=a\theta$, in which $r=$the radius, $\theta=$the angle, and $a=$a constant. The curvature of the cam may therefore be plotted to a convenient size and the divisions of the scale 12 made to correspond with the cam.

As previously stated, when the rate of flow is decreasing during a particular cycle the cam is driven for a longer period and hence through a greater angle than the preceding cycle, whereby the cam engages the arm 63 and moves the pointer 11 back toward the zero position. In such case the motor 17, when it is started, performs its functions as usual, but of course does not actually adjust the pointer since the arm 63 is already in engagement with the cam. The arm 71, however, is moved upward into engagement with the arm 72 as before. Therefore, in the appended claims it will be understood that the means adjusting the pointer each time the motor is started is mechanism operating through a predetermined cycle each time the motor is started to position or check the position of the pointer, as the case may be. The term "position" as applied to the pointer refers to the actual positioning of the pointer and includes also the operation of the mechanism to check or assure the correct positioning of the pointer in accordance with the position of the cam.

I moreover provide a chart 90 for a permanent record. As shown, the chart is circular and secured at its center to a pulley 91 which is connected through a belt drive 92 and gears 93 to the timing motor 66. Preferably the chart is driven one revolution in twenty-four hours. Over the chart sweeps a pen 94 on the end of an arm 95 which is secured to a shaft 96. The shaft 96 is in turn connected through a crank 97, link 98 and crank 99 to the shaft 62. The driving connections for the pen 94 and the chart 90, and the scale on the chart are coordinated so that the pen draws a rate of flow-time curve on the chart. Here again the scale divisions are of equal size for the same variation in the rate of flow.

The pointer 11 is arranged to remain in any position to which it is moved. Ordinarily the friction in its driving parts is sufficient to assure this. Thus the pointer gives a constant indication of the rate of flow, this indication being checked and corrected, if necessary, because of change in the rate of flow after the passage of a predetermined quantity of water through the meter. However, in order that the indicator shall give an accurate indication, it should be checked frequently by cycling of the mechanism, especially where the demand for water or other substance being metered is subject to wide and sudden changes. For example, I contemplate that the speed of the element 13 shall be approximately one revolution per minute for normal flow or made so by suitable speed changing gearing. In other words, if the element 13 of the meter 10 is not driven at a suitable speed, a second element geared through suitable speed changing gearing to the element 13 may be provided, and a suitable disk and contact 15 mounted on this element.

I have also provided an integrating meter 100 which is connected through a suitable chain drive 101 to the shaft 20. This meter is arranged to duplicate the reading of the meter 10.

Also in the cam follower 63 I have provided a supplementary operating projection 102 which engages a supplementary cam member 103 in the cam 64 to prevent sticking or binding between the cam and follower in case the follower engages the lowest portion 104 of the cam, i. e. moves to its lowermost position corresponding to maximum rate of flow. I have found that in that event the cam and its follower may bind at some point whereby the cam is held against rotation by the motor 66. The parts 102, 103 engage at that point and permit the cam to push the follower away without introducing any appreciable error.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States is:

1. The combination in a device for indicating the speed of an element moving repeatedly over a predetermined path, an indicating member, a cam for determining the position of said indicating member, constant speed driving means for moving said cam at a constant speed from a predetermined starting position, actuating means for said indicating member movable into engagement with said cam to position said indicating member, a driving means for moving said indicating member actuating means into engagement with said cam, control means for said driving means operated by said moving element to start and stop said driving means to thereby position said indicating member each time said element moves a predetermined amount, whereby said member indicates the speed of said element in moving said predetermined amount, and means operated by said driving means for returning said cam to said predetermined starting position after adjustment of said indicating member for subsequent operation by said constant speed driving means while said element moves another predetermined amount.

2. The combination in a device for indicating the speed of an element moving repeatedly over a predetermined path, driving means, control means for said driving means operated by said moving element to start and stop said driving means after said element has moved a predetermined amount, a cam, means for biasing said cam to a predetermined position, driving means for moving said cam at a constant speed from a predetermined starting position, a releasable driving connection between said driving means and said cam, an indicating member, operating means therefor, means operated by said first driving means each time it is started for moving said indicating member operating means into engagement with said cam to thereby adjust the position of said indicating member in accordance with the position of said cam, and means driven by said first driving means for thereafter releasing said driving connection momentarily to provide for return of said cam to said predetermined starting position in accordance with its bias.

3. In combination, a driving motor, control means operating to start and stop said motor when a predetermined quantity of a substance has passed a predetermined point, a cam, means for turning said cam at a constant speed, an indicating member, actuating means for said indicating member arranged to be moved into engagement with said cam to position said member to indicate the rate of flow of said substance, means driven by said motor for moving said actuating means into engagement with said cam, and means operated by said motor for returning said cam to a predetermined starting position.

4. The combination with an element rotating at a speed proportional to the rate of flow of a substance being measured, of a rate of flow indicating device, comprising a motor, electrical connections operated by said rotating element to start and stop said motor at least once each revolution of said rotating element, a cam, means for biasing said cam to a predetermined angular starting position, an indicating member, operating means for said indicating member normally disengaged from said cam but arranged to be moved into engagement with said cam to move said indicating member in dependence upon the position of said cam, constant speed driving means, clutch means connecting said constant speed driving means to said cam to drive said cam against its bias, means operated by said motor for moving said indicating member operating means into engagement with said cam each time said motor is started to thereby actuate said indicating member, and means operated by said motor for thereafter releasing momentarily said clutch means whereby said cam returns to said angular starting position in accordance with its bias.

5. The combination in a device for indicating the speed of an element moving repeatedly over a predetermined path, an indicating member, a motor, control means for said motor operated by said moving element to start said motor each time said element has moved a predetermined amount, a cam, means for moving said cam at a constant speed from a predetermined starting position, a shaft, means for biasing said shaft to a predetermined angular position, said biasing means reversing its bias when said shaft has been turned through more than a half revolution, means operated by said motor each time it is started for turning said shaft through more than a half revolution, means operated by said shaft for adjusting the position of said indicating member in accordance with the position of said cam, means operated by said shaft after adjustment of said indicating member for returning said cam to said starting position, and means for stopping said motor before said moving element has moved another predetermined amount.

6. The combination in a device for indicating the speed of an element moving repeatedly over a predetermined path, an indicating member, a motor, control means for said motor operated by said moving element to start said motor each time said element has moved a predetermined amount, a cam, driving means for moving said cam at a constant speed from a predetermined starting position, a shaft, means for biasing said shaft to a predetermined angular position, said biasing means reversing its bias when said shaft has been turned through more than a half revolution, a driving connection between said motor and said shaft, means driven by said motor for disconnecting said motor from said shaft after it has turned said shaft through more than a half revolution, means operated by said shaft for adjusting the position of said indicating member in accordance with the position of said cam, means operated by said shaft after adjustment of said indicating member for returning said cam to said predetermined starting position for subsequent operation by said cam driving means, and means for stopping said motor before said element has moved another predetermined amount.

7. The combination in a device for indicating the speed of an element moving repeatedly over a predetermined path, an indicating member, a motor, control means for said motor operated by said moving element to start said motor each time said element has moved a predetermined amount, a cam, driving means for moving said cam at a constant speed from a predetermined starting position, a shaft, means for biasing said shaft to a predetermined angular position, said biasing means reversing its bias when said shaft has been turned through more than a half revolution, a driving connection including releasable means between said shaft and said motor, speed responsive means driven by said motor tending to release said releasable means upon operation of said driving motor, latching means for holding said releasable means in driving relation, a releasing cam driven by said motor for releasing said latching means when said shaft has been rotated more than a half revolution whereupon said shaft is disconnected from said motor, means operated by said shaft for adjusting the position of said indicating member in accordance with the position of said cam, means operated by said shaft after adjustment of said indicating member for returning said cam to said predetermined starting position for subsequent operation by said cam driving means, and means for stopping said motor before said element has moved another predetermined amount.

8. The combination with an element rotating at a speed proportional to the rate of flow of the substance being measured, of a remote rate of flow indicating device comprising a driving motor, electrical connections operated by said rotating element to start and stop said motor each revolution of said rotating element, a cam, means for biasing said cam to a predetermined angular starting position, an indicating member, operating means for said indicating member normally disengaged from said cam but arranged to be moved into engagement with said cam to move said indicating member in dependence upon the position of said cam, constant speed cam driving means, clutch means connecting said constant speed driving means to said cam to drive said cam against its bias, a shaft, means driven by said motor for rotating said shaft one complete revolution only each time the driving motor is started regardless of the length of time the driving motor is running, means operated by said shaft each revolution thereof for moving said indicating member operating means into engagement with said cam and for thereafter momentarily disengaging said clutch to return said cam to said starting position, said cam moving independently of said indicating member to said starting position whereby said indicating member gives a constant indication of the rate of flow of the substance being measured.

9. The combination with an element rotating at a speed proportional to the rate of flow of the substance being measured, of a remote rate of flow indicating device actuated by said element comprising a driving motor, electrical connections operated by said rotating element to start and stop said motor each revolution of said rotating element, an indicator cam mounted for rotation, said cam having the shape of an Archimedean spiral, means for biasing said cam to a predetermined angular starting position, a constant speed cam driving motor, clutch means connecting said cam driving motor to said cam, a shaft, a counterweight on said shaft for biasing said shaft to a predetermined angular starting position, a driving connection including a releasable means between said shaft and said driving motor, speed responsive means tending to release said releasable means upon operation of said driving motor, latching means for holding said releasable means in driving relation, a releasing cam driven by said driving motor for releasing said latching means when said shaft has been rotated more than a half revolution whereupon said speed responsive means operates said releasing means to disconnect said shaft from said driving motor and said counter-weight turns said shaft to complete a single revolution, an indicating device, actuating means for said indicating device arranged to be moved by said shaft into engagement with said indicator cam whereby said indicating device is actuated to indicate the rate of flow of the substance being measured, and means actuated by said shaft for thereafter releasing said clutch means momentarily whereupon said indicator cam returns to said predetermined starting position, said releasable means being reconnected by said speed responsive means and latched by said latching means when said motor is stopped by said rotating element.

10. The combination with an element rotating at a speed proportional to the rate of flow of a substance being measured, of a rate of flow indicating device, comprising a driving means, control means for said driving means operated by said rotating element to start and stop said driving means at least once each revolution of said rotating element, an indicating member, positioning mechanism for said indicating member, operating means for said indicating member normally disengaged from said positioning mechanism but arranged to be moved into engagement with said mechanism to position said indicating member in dependence upon the position of said mechanism, constant speed driving means for said positioning mechanism, means operated by said first driving means for moving said indicating member operating means into engagement with said positioning mechanism each time said first driving means is started to thereby actuate said indicating member, and means operated thereafter by said first driving means for returning said positioning mechanism to a predetermined starting position.

11. The combination with an element rotating at a speed proportional to the rate of flow of a substance being measured, of a rate of flow indicating device, comprising a motor, control means for said motor operated by said rotating element to start and stop said motor at least once each revolution of said rotating element, positioning mechanism, means for biasing said mechanism to a predetermined starting position, an indicating member, operating means for said indicating member normally disengaged from said mechanism but arranged to be moved into engagement with said mechanism to move said indicating member in dependence upon the position of said mechanism, constant speed driving means, clutch means connecting said constant speed driving means to said mechanism to drive said mechanism against its bias, means operated by said motor for moving said indicating member operating means into engagement with said mechanism each time said motor is started to thereby actuate said indicating member, and means operated by said motor for thereafter releasing momentarily said clutch means whereby said mechanism returns to said starting position in accordance with its bias.

12. The combination with an element rotating at a speed proportional to the rate of flow of the substance being measured, of a remote rate of flow indicating device actuated by said element comprising a driving means, control means for said driving means operated by said rotating element to start and stop said driving means each revolution of said rotating element, indicator positioning mechanism, means for biasing said mechanism to a predetermined starting position, a constant speed driving motor, clutch means connecting said driving motor to said mechanism, a shaft, a counterweight on said shaft for biasing said shaft to a predetermined angular starting position, a driving connection including a releasable means between said shaft and said driving motor, speed responsive means tending to release said releasable means upon operation of said driving means, latching means for holding said releasable means in driving relation, a releasing cam driven by said driving means for releasing said latching means when said shaft has been rotated more than a half revolution whereupon said speed responsive means operates said releasing means to disconnect said shaft from said driving means and said counterweight turns said shaft to complete a single revolution, an indicating device, actuating means for said indicating device arranged to be moved into engagement with positioning mechanism by said shaft whereby said indicating device is actuated to indicate the rate of flow of the substance being measured, and means actuated by said shaft for thereafter releasing said clutch means momentarily whereupon said mechanism returns to said predetermined starting position in accordance with its bias, said releasable means being reconnected by said speed responsive means and latched by said latching means when said driving means is stopped by said rotating element.

13. The combination with an element rotating at a speed proportional to the rate of flow of the substance being measured, of a remote rate of flow indicating device actuated by said element comprising a driving motor, control means operated by said rotating element to start and stop said motor each revolution of said rotating element, an indicating member, positioning mechanism for said indicating member, a constant speed motor for said positioning mechanism, a shaft, a counterweight on said shaft for biasing said shaft to a predetermined angular starting position, a driving connection including a releasable means between said shaft and said driving motor, means responsive to the operation of said motor for releasing said releasable means when said shaft has been rotated more than a half revolution whereupon said counterweight turns said shaft to complete a single revolution, actuating means for said indicating member moved by said shaft into engagement with said positioning mechanism whereby said indicating member is actuated to indicate the rate of flow of the substance being measured, and means actuated by said shaft for thereafter returning said positioning mechanism to a predetermined starting position.

14. The combination with an element rotating at a speed proportional to the rate of flow of the substance being measured, of a rate of flow indicating device, comprising a driving means, control means for said driving means operated by said rotating element to start and stop said driving means at least once each revolution of said rotating element, a cam, an indicating member, operating means for said indicating member normally disengaged from said cam but arranged to be moved into engagement with said cam to move said indicating member in dependence upon the position of said cam, constant speed driving means, clutch means connecting said constant speed driving means to said cam to drive said cam, means operated by said driving means for moving said indicating member operating means into engagement with said cam each time said driving means is started to thereby actuate said indicating member, and means operated by said driving means for thereafter releasing said clutch means, returning said cam to a predetermined angular starting position, and reengaging said clutch means.

15. The combination in a device for indicating the speed of an element moving repeatedly over a predetermined path, an indicating member, positioning mechanism for said indicating member, constant speed driving means for moving said positioning mechanism at a constant speed, operating means for said indicating member movable into engagement with said positioning mechanism to position said indicating member, a driving means for moving said indicating member operating means into engagement with said positioning mechanism, control means for said driving means operated by said moving element to start and stop said driving means to thereby position said indicating member each time said element moves a predetermined amount, whereby said member indicates the speed of said element in moving said predetermined amount, and means operated by said driving means for returning said positioning mechanism to a predetermined starting position after adjustment of said indicating member for subsequent operation by said constant speed driving means while said element moves another predetermined amount.

16. The combination in a device for indicating the speed of an element moving repeatedly over a predetermined path, an indicating member, positioning mechanism for said indicating member, means for biasing said positioning mechanism to a predetermined starting position, constant speed driving means, clutch means connecting said constant speed driving means to said positioning mechanism, operating means for said indicating member movable into engagement with said positioning mechanism to position said indicating member, a driving means for moving said indicating member operating means into engagement with said positioning mechanism, control means for said driving means operated by said moving element to start and stop said driving means to thereby position said indicating member each time said element moves a predetermined amount, and means operated by said driving means for releasing said clutch means momentarily after adjustment of said indicating member whereby said positioning mechanism returns to said predetermined starting position in accordance with its bias for subsequent operation by said constant speed driving means while said element moves another predetermined amount.

WILLIAM L. HERRON.